(12) United States Patent  
Calabrese et al.

(10) Patent No.: US 9,553,971 B2  
(45) Date of Patent: Jan. 24, 2017

(54) PORTABLE DEVICE-ENABLED MONITORING AND SECURITY SYSTEM

(71) Applicant: CALABRESE STEMER LLC, Hollywood, FL (US)

(72) Inventors: Gerard Calabrese, Southwest Ranches, FL (US); Werner H. Stemer, Fort Lauderdale, FL (US); Sandra Calabrese, Orlando, FL (US)

(73) Assignee: Calabrese Stemer LLC, Hollywood, FL (US)

( * ) Notice: Subject to any disclaimer, the term of this patent is extended or adjusted under 35 U.S.C. 154(b) by 0 days.

(21) Appl. No.: 14/695,503

(22) Filed: Apr. 24, 2015

(65) Prior Publication Data

US 2015/0310728 A1    Oct. 29, 2015

Related U.S. Application Data

(60) Provisional application No. 61/983,728, filed on Apr. 24, 2014.

(51) Int. Cl.

| | |
|---|---|
| *G08B 1/08* | (2006.01) |
| *H04M 1/725* | (2006.01) |
| *G08B 13/196* | (2006.01) |
| *G08B 17/12* | (2006.01) |
| *G08B 25/08* | (2006.01) |
| *H04M 1/04* | (2006.01) |

(52) U.S. Cl.

CPC .... *H04M 1/72527* (2013.01); *G08B 13/19621* (2013.01); *G08B 13/19636* (2013.01); *G08B 17/125* (2013.01); *G08B 25/08* (2013.01); *H04M 1/04* (2013.01)

(58) Field of Classification Search

CPC ....................................................... G08B 25/10  
USPC ................................................... 340/539.11  
See application file for complete search history.

(56) References Cited

U.S. PATENT DOCUMENTS

| | | | |
|---|---|---|---|
| 8,086,702 B2 | 12/2011 | Baum et al. | |
| 8,535,102 B1 * | 9/2013 | Colahan | H01R 31/06 |
| | | | 439/5 |
| 8,620,841 B1 * | 12/2013 | Filson | H04L 12/1895 |
| | | | 706/12 |
| 8,665,084 B2 * | 3/2014 | Shapiro | G08B 3/10 |
| | | | 340/506 |

(Continued)

*Primary Examiner* — Jennifer Mehmood  
*Assistant Examiner* — John Mortell  
(74) *Attorney, Agent, or Firm* — Werner Stemer

(57) ABSTRACT

A portable device-based monitoring and security system has a docking device with a connector for connecting to a portable electronic device. The docking device has a plurality of sensors that are able to transmit to the portable electronic device signals representing measurement values acquired by the sensors. In one embodiment, the docking device is a base with a cradle and a plug connector for connecting with a jack of the portable electronic device. The base may be an externally powered unit, forming a charging station for the portable electronic device. The sensors may include a carbon monoxide sensor, an ambient light sensor, a sound sensor, a gas sensor, a smoke sensor, a motion sensor, and the like. In the case in which the docking device is a portable dongle or a protective case with a dongle, the sensors are advantageously CO sensors, TDS sensors, pH sensors, breathalyzer or UV sensors.

18 Claims, 2 Drawing Sheets

(56) References Cited

U.S. PATENT DOCUMENTS

| | | | |
|---|---|---|---|
| 2005/0247114 A1* | 11/2005 | Kahn | G01N 33/18 73/53.01 |
| 2007/0047198 A1* | 3/2007 | Crooijmans | G06F 1/1632 361/679.41 |
| 2010/0194860 A1* | 8/2010 | Mentz | H04M 1/0264 348/47 |
| 2010/0295671 A1* | 11/2010 | Sweeney | G08B 17/00 340/533 |
| 2012/0169487 A1* | 7/2012 | Poder | B60R 25/102 340/426.15 |
| 2013/0041590 A1* | 2/2013 | Burich | G06F 19/3418 702/19 |
| 2013/0290591 A1* | 10/2013 | Schwarzkopf | G06F 1/1632 710/303 |
| 2014/0275881 A1* | 9/2014 | Lamego | A61B 5/14532 600/323 |
| 2015/0301615 A1* | 10/2015 | Kasar | G06F 3/017 345/156 |

\* cited by examiner

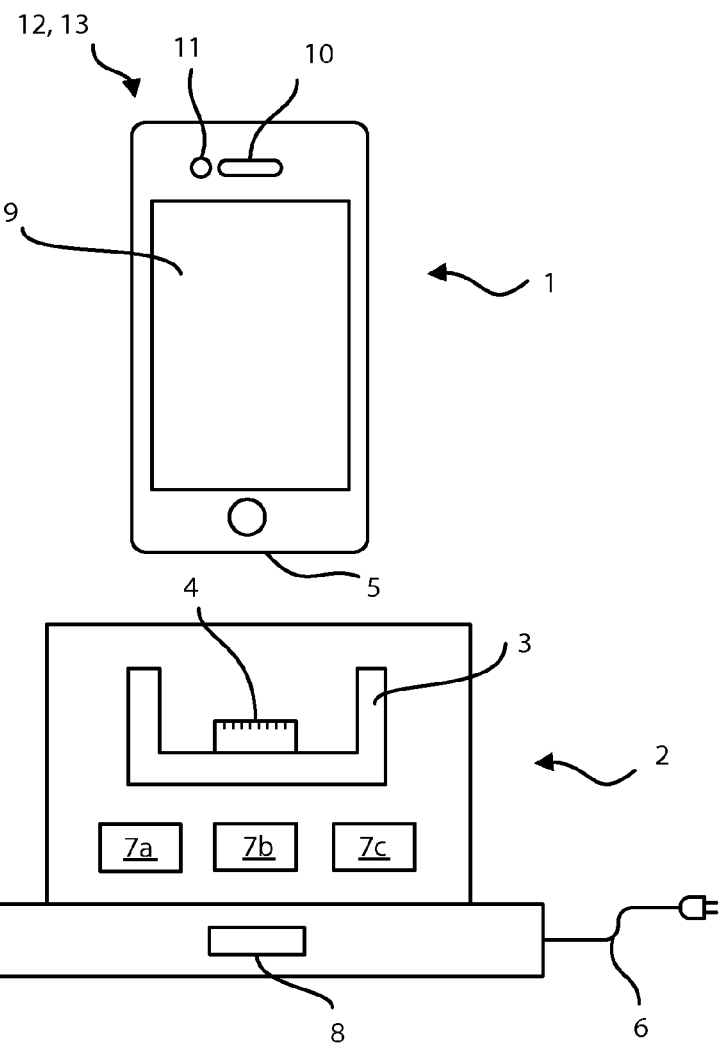
FIG. 1
FIG. 3
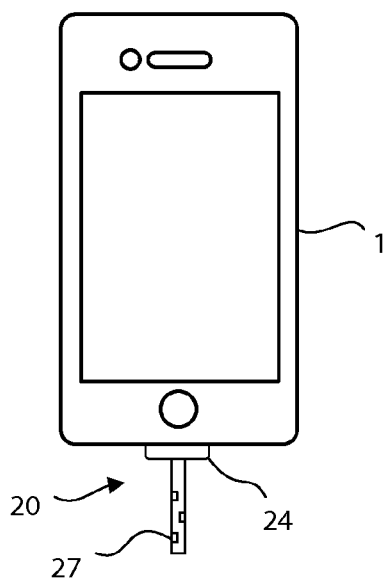

PORTABLE DEVICE-ENABLED MONITORING AND SECURITY SYSTEM

CROSS-REFERENCE TO RELATED APPLICATION

This application claims the benefit, under 35 U.S.C. §119(e), to provisional patent application No. 61/983,728, filed Apr. 4, 2014. The disclosure of the prior application is herewith incorporated by reference in its entirety.

BACKGROUND OF THE INVENTION

Field of the Invention

Smart phones and portable computers have recently become very powerful not only in pure computing and processing aspects, but also in interaction with other systems and devices. Most smart phones are constantly on and connected to a network, whether through a cellular network or a WiFi connection.

Further, smart phones and similar portable electronic devices (e.g., tablets such as the iPad®, laptops, etc.) accompany their users typically day and night, whether at home or on the road.

BRIEF SUMMARY OF THE INVENTION

It is accordingly an object of the invention to provide a portable electronic-device based system which overcomes the above-mentioned and other disadvantages of the heretofore-known devices and methods of this general type and which is able to harness a multitude of capabilities of the smart phone and the tablet that are not otherwise available. Specifically, the device should become usable, in accordance with the invention, as a security device or simply as a monitor in fully portable or stationary form.

With the foregoing and other objects in view there is provided, in accordance with the invention, a portable device-based security system, comprising:

a docking device having a connector for connecting to a portable electronic device, the portable electronic device being equipped with networking connectivity and a processor for processing and executing at least one software application;

the docking device containing a plurality of sensors connected to the connector and configured to transmit to the portable electronic device signals representing measurement values acquired by the sensors; and wherein the sensors are operated by drivers received by the portable electronic device through a network connection.

We will use the terms "portable electronic device" or "portable device." These terms encompass smart phones, tablets, hybrid devices, i.e., any device with the capability of wireless or LAN connectivity. These include, but are not limited to: laptop computers with wireless capabilities, cellular/personal communication system devices, audio/video/data recording or playback devices, scanning devices, remote sensors, messaging devices, personal digital assistants . They have in common that they are enabled to communicate wirelessly (e.g., through a cellular network or WLAN), through plug-in hardwired connections, and they also incorporate considerable computing power. Further, most of the state-of-the-art portable devices include various input systems and sensors, including a camera, a microphone, GPS, gyro-sensor, accelerometer, and the like, that may be integrated into and accessed through our novel system.

Latest developments even point to the introduction in smart phones of environmental sensors such as carbon monoxide (CO) sensors and similar gas detectors. See, for example, a corresponding publication by the Department of Homeland Security Science and Technology Division.

In accordance with an added feature of the invention, the docking device is a base formed with a cradle for receiving the portable electronic device and a plug connector for connecting with a jack of the portable electronic device. The base may be an externally powered unit with an a.c. connector and the base is configured as a charging station for the portable electronic device.

In accordance with an additional feature of the invention, the base has the plurality of sensors mounted thereon and the sensors are selected from the group consisting of carbon monoxide sensors, ambient light sensors, sound sensors, gas sensors, smoke sensors, motion sensors, temperature sensors, and combinations thereof.

In accordance with another feature of the invention, the base contains control unit configured to control a communication with the portable electronic device, the control unit includes a programmable processor for processing an application program. In a preferred embodiment, the control unit is configured, upon being connected to the portable electronic device, to receive update information from the portable electronic device for sporadically updating the application program resident thereon.

In accordance with a further feature of the invention, the docking device is configured to communicate with the portable electronic device through a wireless connection, through a universal serial bus, or through near field communication.

With the above and other objects in view there is also provided, in accordance with the invention, a portable device-based security system with a docking device that is formed as a protective case or sleeve. The latter is configured to encase the portable electronic device with a backwall, an encasing sidewall, and a dongle attachment. In a preferred development, the backwall of the protective case is formed with printed conductor tracks defining a printed circuit board for mounting electronic devices and for connecting the electronic devices to the portable electronic device.

In accordance with again an added feature of the invention, the sensors are selected from the group consisting of a carbon monoxide sensor, a breathalizer, a UV sensor, and a smoke sensor.

In a particularly preferred embodiment, which is suitable especially for the technical fields dealing with water and water purity (pool maintenance, aquarium technology, waterworks, etc.) the sensors include at least one TDS (total dissolved solids) sensor and/or a pH sensor and/or a salinity.

In summary, we provide an assembly which includes a plurality of sensors in a portable unit that connects to the portable electronic device and harnesses the power of the electronic device. The portable unit uses, at a minimum, the communication capabilities of the electronic device. As a backup, or in addition, a base or dock may be provided that is either hardwired or WiFi-enabled so as to utilize a direct Internet connection.

Other features which are considered as characteristic for the invention are set forth in the appended claims.

Although the invention is illustrated and described herein as embodied in a portable device-enabled monitoring and security system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 1 illustrates a basic assembly of a cell phone and a base according to a first embodiment of the invention;

FIG. 3 is an assembly of a cell phone and an appendage according to a second embodiment of the invention.

DESCRIPTION OF THE INVENTION

Figure 2:
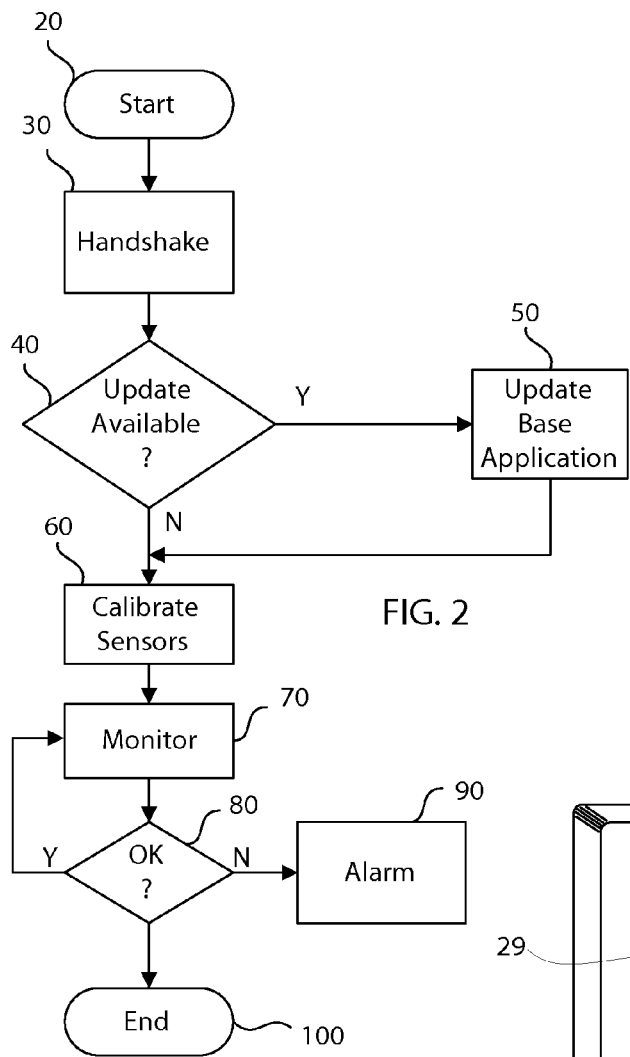
FIG. 2 is a flowchart illustrating the process according to the invention.

Referring now to the figures of the drawing in detail and first, particularly, to FIG. 1 thereof, there is shown a portable electronic device 1, here in the form of a smart phone (e.g., iPhone®, Galaxy®, HTC®, Lumia®, etc.), and a base 2 (also referred to as a portable unit), here in the form of a dock or base that is similar in form to a night-stand base.

The base 2 is enabled to communicate with the electronic device 1. Here, there is provided a cradle 3 with a plug connector 4 that connects with the jack 5 in the electronic unit 1 when the latter is inserted into the cradle 3. The communication may also be effected through a wireless connection, such as Bluetooth®, WLAN, USB, and/or near field communication.

The base 2 may be an externally powered unit or it may be battery operated. If an a.c. connector 6 is provided, the base may be used to charge the electronic device 1. In the illustrated case with the iPhone® 4 connector, the charging is effected through the plug/socket connection 4/5. In other cases, the charging can be effected through capacitive charging. The cradle 3 will, for that purpose, be adapted to the specific technology of the specific electronic device 1.

The base 2 is provided with a plurality of sensors 7 (7a, 7b, 7c). Here, they are provided for ambient light sensing, for sound sensing, gas sensing (e.g., carbon monoxide, or lack of oxygen) or sensing of specific odors, smoke sensing, motion sensing, temperature, etc. Various additional sensors may be provided and/or combinations of these into single sensing capability.

A control unit 8 is provided in the base 2. The control unit 8 controls the communication with the electronic unit 1 and processes, or pre-processes as the case may be, the various signals of the sensors 7. The control unit 8 includes a processor, which may take the form of an ASIC or another simple programmable processor. The application program stored in the control unit 8 can be sporadically updated. For that purpose, the processor will check the corresponding application (i.e., app) on the electronic device for an available update each time the electronic device 1 is connected to the base. The electronic device 1 receives its updates, or at least a notification that an update is available, automatically through its app server or (app) store.

The electronic device 1 includes a touch screen 9, a non-illustrated microphone, a miniature speaker 10 and a camera lens 11. A further camera lens 12 is provided on the opposite side, as well as a flash light strobe 13.

Referring now to FIG. 2, the application program is automatically started when the electronic device 1 is placed in the cradle 3, or the communication between the base 2 and the electronic device 1 is otherwise started.

The application ("app") resides on the electronic device. It is started manually. When the device 1 is docked, the app can monitor in the background or it can be fore-fronted. Upon triggering the process at a starting step 20, the two devices run through a handshake routine at 30. This includes an identification of each other and the synchronization, if necessary, of the communication protocol. At step 40, the base queries whether or not an update for its app program is available. The app on the electronic device 1 has been updated automatically and the update for the base 2, if available, is present in a corresponding memory segment of the electronic device. If an update is available, the program branches to step 50, where the program of the base 2 is updated. This allows the latest capabilities of the electronic device 1 and also the latest capabilities of the base 2 to become utilized in the system.

After the update is complete at 50, the program initiates a calibration of the sensors 60. The calibration includes the sensors 7 of the base 2 and also the sensors of the electronic device 1, in combination. For instance, the front camera 12 and the rear camera 11 each takes a photograph (with or without strobe) and stores the calibration photograph or a corresponding base signal. These may then be used at a later time as comparisons. For example, if an B&E intrusion is detected at a later point in time, the calibration photograph may be compared with a newly acquired photograph or signal. The system may quite easily deduce from the comparison whether or not an intrusion is indeed taking place. If a smoke alarm situation is detected, the comparison of a current photo sensor signal with the corresponding stored signal would indicate a much higher "white" content and reduced contrast. Again, the system may quite easily deduce from the comparison whether or not a smoke alarm should be triggered.

The program then continues to step 70, which represents the main monitoring process. Depending on the type of sensor that monitors the environment, the scan frequency may vary widely. For example, smoke sensing or gas sensing (e.g., CO sensing) may be effected at a frequency of 1 Hz or even less. Sound sensing, which is particularly well suited for intrusion sensing, may be effected at a frequency of 10 Hz, for example. In this regard, the sound level may be monitored by the electronic device 1, which is equipped with at least one microphone, or the sensing may be shared by the electronic device 1 and the base 2, if the latter is equipped with one or more microphones (e.g., sensor 7a).

During the regular process, the program cycles through the monitoring step 70 and the corresponding query step 80 in a loop. If a disturbance is detected, an alarm is triggered at 90. The alarm may take any of a plurality of forms, depending on the program app and the setting provided by the user. The alarm may include taking a photograph (with or without strobe), forwarding the photograph through the network to which the electronic device is connected (e.g., for cloud storage or emergency personnel call), an audible alarm may be triggered to wake or summon the user, flashing lights (e.g., flashing the strobe light), text/SMS or MMS message, etc. The user may have recorded a corresponding "warning" message and that message can be played back in the user's own voice.

Many specific applications can be developed on the basis of the novel system. For example, motion sensing for intrusion detection (and corresponding reactive processing, as described above) can be combined with an accelerometer app that senses for the presence of an earthquake. Simple shaking of the device, or course, does not trigger an earthquake warning. Upon being alerted to unusual vibration or oscillation, the electronic device tests the activity for characteristic frequency behavior. Earthquake rumbling has a specific signature and, if that signature is detected in the analysis, a corresponding alarm is issued. This is especially useful during the night when the user is asleep. Instead of waking up late to damaging intensity of the earthquake, the user can be alerted very quickly and thus be enabled to leave the premises more quickly and before the building is subjected to structural damage that may also injure its occupants.

The same sensing capability, of course, is useful in an intrusion detection system. For that purpose, it may suffice to provide a hanger that allows the device to simply be hung on/suspended from a door handle (e.g., of a hotel room). When the accelerometer detects unusual vibration, the electronic device analyzes the vibrations and responds with a corresponding alert or alarm.

There are many wireless security sensors available and also installed. As a personal alarm, the base unit 2 can provide the gateway to these sensors and open up a lot of other options for sensor interfacing. The system may be enabled to interface with existing and future commercially available wireless sensors. The novel system can be tuned to the frequencies of those alarm systems so as to recognize the alarm and add further alerting capability. For instance, children and young adults especially have a tendency to sleep through the sounds emanating from smoke and fire alarms. If, say, a smoke alarm goes off, the assembly base 2 and device 1 "hear" the alarm, and trigger further audible, visual, and/or vibratory alerts, it is much more likely that the user will wake up.

The base 2 may be provided with a hardwired Internet connection and/or a separate WLAN connection. This may be useful as a backup and also to interface with other network devices, for example, when the cellular network is down or the system is in a grey area of cell coverage.

Referring now to FIG. 3, there is shown a further embodiment of the invention. Here, there is provided a portable sensing system to be used for a multitude of differently applicable situations. The assembly of FIG. 3 consists of the electronic device 1 and an appendage in the form of a dongle 20. Again, the electronic device 1 is illustrated as an iPhone® and, accordingly, the dongle 20 is attached by way of the main I/O terminal 5 of the iPhone®. The dongle 20 thus carries a plug 24 through which the dongle 20 communicates with the electronic device 1 and also receives the necessary power. A plurality of sensors 27 are carried on/in the dongle 20, each with a different sensibility.

While the dongle 20 is shown connected to the main I/O port, it may also be connected to the data/audio I/O port, where the headphones are typically connected. There, a four-lead miniature connector may be inserted.

A first sensor 27, by way of example, is a TDS (total dissolved solids) sensor, which is typically used to test the quality of water. Additional analysis is available with the TDS sensor, for example, quick testing of a beverage as to a recent addition of a pulverulent substance (e.g., Flunitrazepam, Rohypnol). For law enforcement purposes, it is also possible to quickly test for illegal substances (e.g., cocaine, methamphetamines or precursors, etc.), for bomb-making materials, or for effluent indicators of smuggled pharmaceutical preparations. Another possibility is to provide ISEs (ion selective electrodes). These are membrane electrodes that respond selectively to ions in the presence of other ions. Such probes that measure specific ions and gasses in solution are easily personalized to any specific requirement.

A second sensor 27, by way of example, is a breathalyzer. It may not be absolutely necessary, in this context, to provide a carefully calibrated device (such as would be required for law enforcement purposes), but simply a device that provides relatively accurate information concerning the effluent alcohol content in the breath of a user. This, in turn, can also provide conclusions with regard to the current blood-alcohol content. Additional breath analysis is possible as well, for example, analysis of the bacteria content in the breath of the user (e.g., for bad breath detection).

Figure 4:
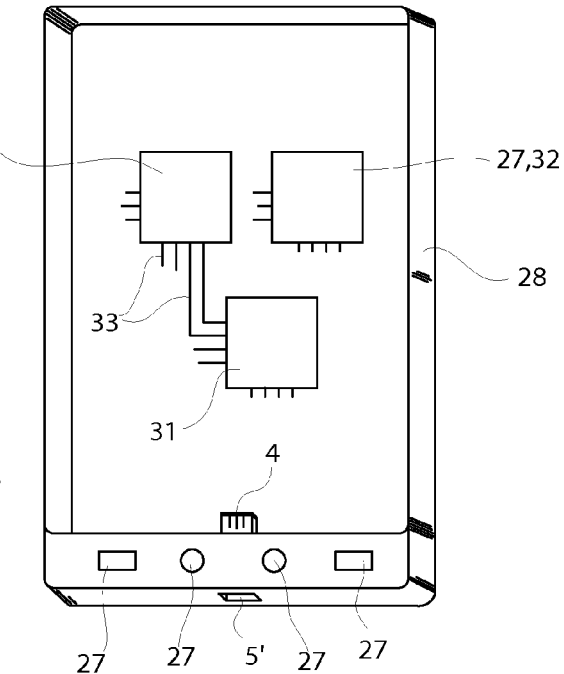
FIG. 4 is a perspective view of a protective case for a smart phone device including sensors and connectors with added functionality according to the invention.

FIG. 4, finally, illustrates a highly versatile multifunction attachment for a smart phone or tablet. Here, the various sensors 27 are integrated in a protective case 28. The case may permanently remain on the smart device. For that purpose, there is provided a connector 4, which forms an integral part of the case 28, and a jack 5'. The connector 4 and the jack 5' illustrated in FIG. 4 are the narrow multi-lead jacks as they are used by Apple® in the newer iPhone® and iPad generations. The added sensors may include a UV sensor and an RFID chip.

The lower portion of the illustration that contains the sensors 27 and the jack 5' is, in effect, an integrated dongle attachment. It may contain the same sensors as the dongle of FIG. 3 and, in addition, various other sensors and also a processor.

Due to the relatively large surface area that is available on the backwall of the case 28, the sensors 29, 31, and/or 32 may be formed as microphone membranes, thus providing high fidelity, true stereo recording capabilities. The large backwall also offers itself for versatile electrical connectivity through printed-on conductor tracks 33. The backwall of the case 28 is thus in effect a printed circuit board (PCB) which allows a vast multitude a miniature devices to be installed and connected. At the same time, the system is highly adaptable for many different environments and customer requirements.

The invention claimed is:

1. A portable device-based security system, comprising:
    a docking device configured for connecting to a portable electronic device, the portable electronic device being equipped with networking connectivity and a processor for processing and executing at least one software application;
    said docking device containing a plurality of sensors mounted thereon and configured to transmit to the portable electronic device signals representing measurement values acquired by said sensors; and
    wherein said sensors are operated by drivers received by the portable electronic device through a network connection and transferred to said docking device.

2. The portable device-based security system according to claim 1, wherein said docking device is a base formed with a cradle for receiving the portable electronic device and a plug connector for connecting with a jack of the portable electronic device.

3. The portable device-based security system according to claim 2, wherein said base is an externally powered unit with an a.c. connector and said base is configured as a charging station for the portable electronic device.

4. The portable device-based security system according to claim 2, wherein said sensors are selected from the group consisting of carbon monoxide sensors, gas sensors, smoke sensors, and combinations thereof.

5. The portable device-based security system according to claim 2, wherein said base contains a control unit configured to control a communication with the portable electronic device, said control unit including a programmable processor for processing an application program.

6. The portable device-based security system according to claim 5, wherein said control unit, upon being connected to the portable electronic device, receives update information from the portable electronic device for sporadically updating the application program resident thereon.

7. The portable device-based security system according to claim 1, wherein said docking device is configured to communicate with the portable electronic device through a wireless connection, through a universal serial bus, or through near field communication.

8. The portable device-based security system according to claim 1, wherein said docking device is a protective case configured to encase the portable electronic device with a backwall, an encasing sidewall, and a dongle attachment.

9. The portable device-based security system according to claim 8, wherein said backwall of said protective case is formed with printed conductor tracks defining a printed circuit board for mounting electronic devices and for connecting said electronic devices to the portable electronic device.

10. The portable device-based security system according to claim 1, wherein said sensors are selected from the group consisting of a carbon monoxide sensor, a breathalyzer, a UV sensor, and a smoke sensor.

11. The portable device-based security system according to claim 1, wherein said sensors include a TDS (total dissolved solids) sensor, a pH sensor, and/or a salinity sensor.

12. The portable device-based security system according to claim 1, wherein said sensors include at least one ISE (ion selective electrode) sensor.

13. A portable device-based security system, comprising:
a docking device being a dongle configured for directly connecting to a portable electronic device, the portable electronic device being equipped with networking connectivity and a processor for processing and executing at least one software application;
said dongle having a plurality of sensors mounted thereon and said dongle being configured to transmit to the portable electronic device signals representing measurement values acquired by said sensors;
said plurality of sensors being selected from the group consisting of carbon monoxide sensors, sound sensors, gas sensors, smoke sensors, motion sensors, temperature sensors, a breathalyzer, a UV sensor, a TDS (total dissolved solids) sensor, a pH sensor, a salinity sensor, an ISE (ion selective electrode) sensor, and combinations thereof; and
wherein the at least one software application to be executed by the portable electronic device is configured to receive the signals representing the measurement values acquired by said sensors, to process the signals and to selectively generate security-related output which, if appropriate, prompts a user of the portable electronic device to take action responsive to measurements taken by said sensors.

14. The portable device-based security system according to claim 13, wherein said dongle contains a control unit configured to control a communication with the portable electronic device, said control unit including a programmable processor for processing an application program.

15. The portable device-based security system according to claim 14, wherein said control unit, upon being connected to the portable electronic device, receives update information from the portable electronic device for sporadically updating the application program resident thereon.

16. The portable device-based security system according to claim 1, wherein:
the at least one software application, upon being executed by said portable electronic device, processes the signals representing the measurement values acquired by said sensors, and generates security-related output, if appropriate, to prompt a user of said portable electronic device to take action in response to measurements taken by said sensors.

17. The portable device-based security system according to claim 16, wherein said sensors include a carbon monoxide sensor, a gas sensor, and a smoke sensor.

18. The portable device-based security system according to claim 16, wherein said sensors include a breathalyzer, a UV sensor, a TDS (total dissolved solids) sensor, a pH sensor, a salinity sensor, and an ISE (ion selective electrode) sensor.

* * * * *